Aug. 6, 1935.      S. R. BERGMAN      2,010,711
COMPOSITE MATERIAL AND METHOD OF MANUFACTURING THE SAME
Filed Aug. 9, 1933
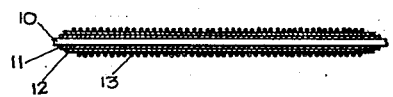
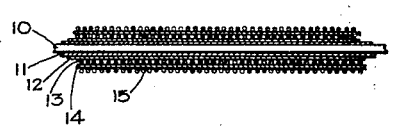
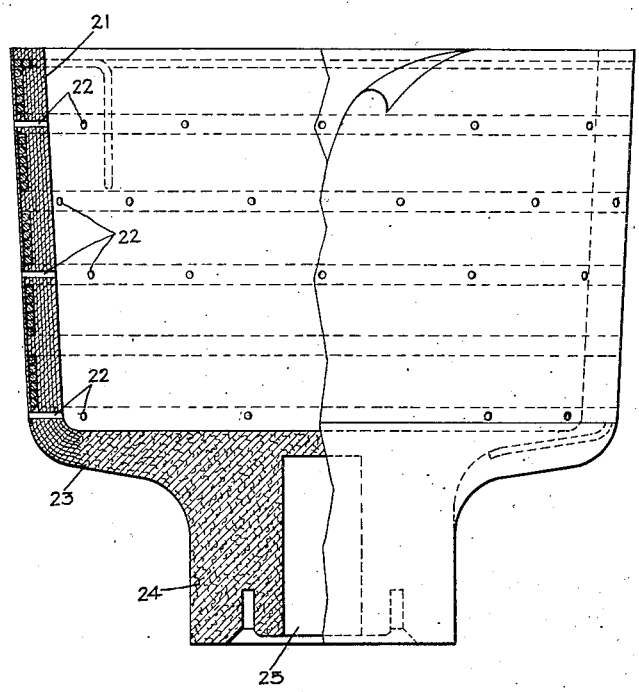
Inventor:
Sven R. Bergman,
by Harry E. Dunham
His Attorney.

Patented Aug. 6, 1935

2,010,711

UNITED STATES PATENT OFFICE 2,010,711

COMPOSITE MATERIAL AND METHOD OF MANUFACTURING THE SAME

Sven R. Bergman, Nahant, Mass., assignor to General Electric Company, a corporation of New York Application August 9, 1933, Serial No. 684,408

2 Claims. (Cl. 117—53)

In connection with the use of material comprising a non-metallic fibrous material united by an artificial resin such as a phenolic condensation product, it becomes desirable for certain applications to reinforce it with metal such as steel. Also, for certain uses, it becomes desirable to cover a metal, such as steel, with material comprising a non-metallic fibrous material united by an artificial resin. In both cases, difficulty has been experienced due to the fact that an artificial resin, such as a phenolic condensation product, does not adhere directly to a metal such as steel so that it has been necessary to rely upon a mechanical connection between the metal and the non-metallic fibrous material united by the artificial resin.

The object of the present invention is to provide an improved composite material wherein a bond exists between a metal, such as steel, and non-metallic fibrous material united by an artificial resin, and an improved method of manufacturing such composite material.

For a consideration of what I believe to be novel and my invention, attention is directed to the accompanying description and the claims appended thereto.

An application of my invention is in connection with rayon spinning buckets of the type disclosed and claimed in my Patent 1,979,953 patented November 6, 1934, and I have elected to specifically illustrate and describe my invention in connection with such rayon buckets. It is understood, however, that this is only by way of example and that the invention is not limited necessarily to this use.

In the drawing, Figs. 1 to 6 illustrate successive steps utilized in carying out my method; and Fig. 7 is a side elevation, partly in section, of a rayon spinning bucket embodying my invention.

I have discovered that a bond may be formed between a non-metallic fibrous material united by an artificial resin and a metal, such as steel, by first applying to the metal an initial coating which adheres to the metal and which is softened, at least on its surface, by the matters driven off from the artificial resin during the curing process, and applying to this coating the coating or covering of artificial resin and the non-metallic fibrous material. By this arrangement, I have found that the non-metallic fibrous material and the artificial resin which unites it unite also with the initial coating which is bonded to the metal so that there results a construction wherein the non-metallic fibrous material united by the artificial resin is bonded to the metal through the intermediary of a layer of material which adheres both to the metal and to the artificial resin.

In Figs. 1 to 6 of the drawing, I have illustrated my invention in connection with steel wire provided with a covering comprising non-metallic fibrous material united by an artificial resin, the covered wire being well adapted for use in reinforcing rayon spinning buckets of the type disclosed in my above referred to patent.

In Figs. 1 to 6, 10 indicates a steel wire, such as a piano wire, which is to be covered with non-metallic fibrous material united by an artificial resin and which is to be used for winding around a rayon spinning bucket for reinforcing the same, the bucket itself being formed of non-metallic fibrous material united by an artificial resin. According to the illustrated embodiment of my invention, I take the wire 10 and apply to it first a coating 11 which adheres to the wire and which is softened, at least on its surface, by the matter driven off from the artificial resin during the curing of the artificial resin. The coating 11 may comprise enamel such as is used ordinarily for insulating wire. Such an enamel comprises mainly linseed oil and China-wood oil, a solvent, such as kerosene, and coal tar oil. It is applied to the wire by passing the wire through the enamel and then baking it. A coating of enamel of the required thickness may be provided by successive applications and bakings. Baking enamels of this type for coating insulating wire are already known and the method of applying and baking them well understood. In so far as my invention is concerned, the essential thing is that the enamel be of a character such that it is softened, at least on its surface, by the matter driven off from the artificial resin during the curing operation. I then take the wire which has been coated with enamel and pass it through a solution of the artificial resin. I utilize a fairly thick solution of the artificial resin and wipe the excess off. This provides a coating 12 on the wire. I have found a solution which at ordinary room temperature is about the consistency of molasses to be satisfactory. After the wire comes from the artificial resin solution and while it is still moist, I wind the wire with cotton thread as is indicated at 13 in Fig. 4. I may utilize cotton thread which has been treated with artificial resin and dried but ordinarily, I find this to be unnecessary as the moist artificial resin on the wire is sufficient to permeate the fibres of the cotton thread so that it becomes treated with the artificial resin. Following this, I may pass the wire again through the artificial resin, wiping off the excess, thus providing a coating 14 and apply another layer 15 of cotton thread. This process may be repeated as many times as found desirable but for use as a reinforcing means for rayon spinning buckets, I preferably apply only the two layers of cotton thread.

I now place the wire with the coatings thereon in a suitable oven and bake it to partially cure the artificial resin, thereby partially converting it into its hard infusible state. I may then apply one or more additional coats of artificial resin and again bake to partially cure it. The matter driven off from the artificial resin during the curing operation softens at least the surface portion of the enamel and during the baking operation, the artificial resin and the enamel fuse together so that the enamel and resin are integrally united to each other. The matter driven off from the artificial resin during the curing operation comprises solvent, usually alcohol, and certain products resulting from the chemical action which takes place. After the baking process, there is provided a wire having a covering of non-metallic fibrous material united by an artificial resin and which in turn is bonded to the wire by an intermediate layer of enamel, it being thus bonded due to the fact that the enamel adheres to the wire and the non-metallic fibrous material united with an artificial resin adhere to the enamel. The covered wire may now be utilized for the desired purpose, in the present instance as a reinforcing means for rayon spinning bucket.

In connection with Figs. 1 to 6, it will be understood that the drawing is primarily diagrammatic, the several layers being shown on an enlarged scale and quite separate. In actual practice, the layers are relatively thin and closely united.

In Fig. 7, I have shown a rayon spinning bucket comprising a side wall 21 provided with circumferential rings of spaced holes 22 for the escape of acid, a bottom wall 23, and a hub 24 provided with an opening 25 to receive the motor driving spindle. The rows of holes 22 are spaced apart a suitable distance and between such rows side wall 21 is provided with shallow circumferentially extending grooves in which is wound reinforcing wire as shown in Fig. 6. The grooves are preferably connected to each other by angularly extending slots so that the reinforcing wire may be one continuous wire extending from top to bottom of the side wall 21.

The bucket is constructed from an acid resisting moldable material. As a moldable material, I utilize preferably non-metallic fibrous material, for example woven or unwoven cotton, impregnated with and held in a highly compressed state by an artificial resin such as a phenolic condensation product. The side walls may be constructed from woven cotton duck united by artificial resin while the bottom wall and hub, in which the stresses are not so high, may be constructed from unwoven cloth united by an artificial resin or from small pieces of woven cotton cloth (for example, pieces of scrap material) united by an artificial resin. An artificial resin, such as a phenolic condensation product, is acid resisting and forms a covering which protects the cotton fibres from the acid.

The bucket structure is first preformed by an initial molding operation during which the resin is partially cured after which reinforcing wire is wound in the grooves under high tension. After it is in place, the outside of the bucket is provided with a covering comprising a layer or layers of cloth which has been treated with an artificial resin. The structure is then given the final molding, the resin being completely cured. When the structure is given the final molding, the covering on the wire adheres to and becomes an integral part of the walls of the bucket so that there is provided a construction wherein the metal reinforcing wire is in substance bonded to the material of the bucket. With this arrangement, in case one or more of the turns of wire break, the strength of the bucket is decreased but little because the wire is bonded to and forms an integral part of the material of the bucket.

In connection with the wire as shown in Fig. 6, it will be understood that when the wire is to be used in constructing a device, such as a rayon spinning bucket, which requires a final molding operation, the artificial resin is only partially cured prior to being wound on the bucket, it being fully cured during the final molding operation. On the other hand, if the wire is to be used in connection with a device in the construction of which a final molding operation is not involved, then the artificial resin or the wire may be fully cured initially.

What I claim as new and desire to secure by Letters Patent of the United States, is:

1. The method of covering metal wire with an adhering coating of non-metallic thread which comprises providing the wire with a baked-on enamel coating, winding non-metallic thread over the baked-on enamel coating, treating the thread with a solution of an artificial resin, and then curing the artificial resin by heat, said baked-on enamel coating being such that it is at least partially softened by matter driven off from the artificial resin during the curing operation, whereby the thread is bonded to the wire.

2. Metallic wire having a covering of non-metallic thread, said thread being united to the wire through the intermediary of an enamel coating on the wire and an artificial resin applied to the thread.

SVEN R. BERGMAN.